(12) United States Patent
Son et al.

(10) Patent No.: US 8,555,289 B2
(45) Date of Patent: Oct. 8, 2013

(54) SYSTEM AND METHOD FOR DYNAMICALLY MANAGING TASKS FOR DATA PARALLEL PROCESSING ON MULTI-CORE SYSTEM

(75) Inventors: Min Young Son, Yongin-si (KR); Shi Hwa Lee, Seoul (KR); Seung Won Lee, Hwaseong-si (KR); Jeong Joon Yoo, Yongin-si (KR); Jae Don Lee, Paju-si (KR); Young Sam Shin, Paju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 351 days.

(21) Appl. No.: 12/923,793

(22) Filed: Oct. 7, 2010

(65) Prior Publication Data

US 2011/0231856 A1    Sep. 22, 2011

(30) Foreign Application Priority Data

Mar. 16, 2010  (KR) .......................... 10-2010-0023194

(51) Int. Cl.
  *G06F 9/46*   (2006.01)
(52) U.S. Cl.
  USPC .......................................... 718/105; 718/100
(58) Field of Classification Search
  USPC ................................................. 718/103–105
  See application file for complete search history.

(56) References Cited

U.S. PATENT DOCUMENTS

| 7,216,348 | B1 * | 5/2007 | deCarmo ....................... 718/105 |
| 8,028,292 | B2 * | 9/2011 | Inoue et al. .................... 718/105 |
| 8,296,773 | B2 * | 10/2012 | Bose et al. ...................... 718/105 |
| 2006/0095807 | A1 * | 5/2006 | Grochowski et al. ......... 713/324 |
| 2006/0218559 | A1 | 9/2006 | Ahmed et al. |
| 2009/0222654 | A1 * | 9/2009 | Hum et al. ..................... 713/100 |
| 2011/0078697 | A1 * | 3/2011 | Smittle et al. ................. 718/104 |
| 2011/0088041 | A1 * | 4/2011 | Alameldeen et al. ......... 718/105 |
| 2011/0191776 | A1 * | 8/2011 | Bose et al. ..................... 718/102 |

FOREIGN PATENT DOCUMENTS

| JP | 2006-243864 | 9/2006 |
| JP | 2007-188212 | 7/2007 |
| JP | 2007-219577 | 8/2007 |
| JP | 2008-90546 | 4/2008 |
| JP | 2008-191949 | 8/2008 |
| JP | 2009-151774 | 7/2009 |
| KR | 10-2005-0000487 | 1/2005 |
| KR | 10-2006-0127120 | 12/2006 |
| KR | 10-2007-0037427 | 4/2007 |
| KR | 10-2009-0005921 | 1/2009 |
| KR | 10-2009-0066765 | 6/2009 |

* cited by examiner

*Primary Examiner* — Diem Cao
(74) *Attorney, Agent, or Firm* — Staas & Halsey LLP

(57) ABSTRACT

A dynamic task management system and method for data parallel processing on a multi-core system are provided. The dynamic task management system may generate a registration signal for a task to be parallel processed, may generate a dynamic management signal used to dynamically manage at least one task, in response to the generated registration signal, and may control the at least one task to be created or cancelled in at least one core in response to the generated dynamic management signal.

7 Claims, 10 Drawing Sheets

SYSTEM AND METHOD FOR DYNAMICALLY MANAGING TASKS FOR DATA PARALLEL PROCESSING ON MULTI-CORE SYSTEM

CROSS-REFERENCE TO RELATED APPLICATIONS

This application claims the benefit of Korean Patent Application No. 10-2010-0023194, filed on Mar. 16, 2010, in the Korean Intellectual Property Office, the disclosure of which is incorporated herein by reference.

BACKGROUND

1. Field

One or more embodiments of the following description relate to a dynamic task management system and method for data parallel processing on a multi-core system that may dynamically manage parallel tasks to fully utilize available cores in order to reduce processing time while maintaining a stable Quality of Service (QoS).

2. Description of the Related Art

Since a conventional single-core system using a single processor has problems such as a limitation in increasing a clock speed and power issues, a multi-core system using multiple processors is being used instead of the conventional single-core system.

Changes due to hardware limitations of the conventional single-core system inevitably cause changes in software. Since conventional software is based on a single-core system, advantages such as improvement of performance that can be obtained in a multi-core system cannot be expected. This is because the single-core structure is completely different that the multi-core structure.

Accordingly, an important goal in a multi-core system is to develop clear software geared towards utilizing the performance and flexibility provided by multi-core systems while managing the complexity of a multi-core processor program.

Recently, to fully exhibit performance of the multi-core system, research is being actively performed on software for the multi-core system such as an Operating System (OS) for a multi-core, a parallel programming model enabling parallel processing, a dynamic execution environment, and the like.

SUMMARY

The foregoing and/or other aspects are achieved by providing a dynamic task management system, including a parallel processing unit to create a registration signal for a task to be parallel processed, a load manager to generate a dynamic management signal in response to the generated registration signal, the dynamic management signal being used to dynamically manage at least one task, and an Operating System (OS) controller to control the at least one task to be created or cancelled in at least one core in response to the generated dynamic management signal.

The foregoing and/or other aspects are achieved by providing a dynamic task management method, including generating a registration signal for a task to be parallel processed, generating a dynamic management signal in response to the generated registration signal, the dynamic management signal being used to dynamically manage at least one task, and controlling the at least one task to be created or cancelled in at least one core in response to the generated dynamic management signal.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
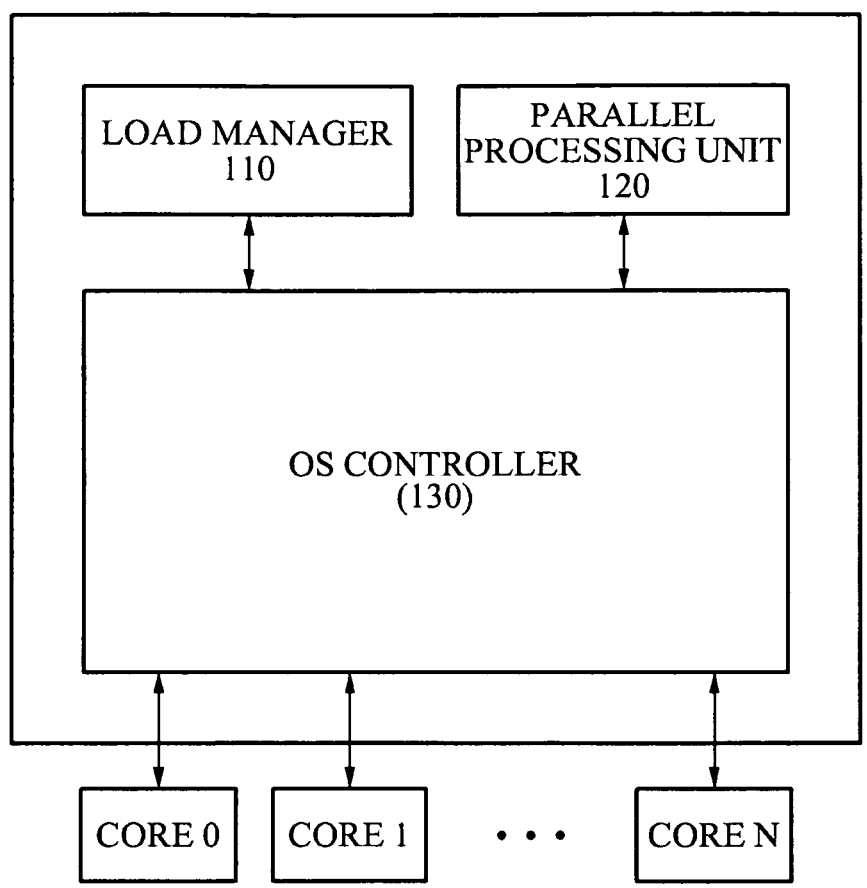
FIG. 1 illustrates a block diagram of a dynamic task management system according to embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a dynamic task management system 100 according to one or more embodiments of the present description.

The dynamic task management system 100 of FIG. 1 may include a load manager 110, a parallel processing unit 120, and an Operating System (OS) controller 130.

The parallel processing unit 120 may generate a registration signal designating a task to be parallel processed.

The load manager 110 may generate a dynamic management signal in response to the generated registration signal. Here, the dynamic management signal may be used to dynamically manage at least one task.

The OS controller 130 may control the at least one task to be created or cancelled in at least one core, in response to the generated dynamic management signal.

The dynamic task management system 100 may efficiently manage tasks for parallel processing in a dynamic execution environment. For example, when several tasks are competitively executed in a core, and when another core is in an idle state where no task is executed, the dynamic task management system 100 may cancel one or more of the several tasks, and may create as many tasks as the number of cancelled tasks in the core in the idle state.

Accordingly, the dynamic task management system 100 may dynamically adjust a number of tasks to be parallel processed, to improve parallel processing performance, or to increase memory utilization.

To efficiently manage tasks for parallel processing in the dynamic execution environment, the parallel processing unit 120 may be used as an Application Programming Interface (API) provided to users, to support data parallel processing.

The load manager 110 may measure and manage a load of the system 100. The OS controller 130 may perform its original function, and may also support functions requested by the load manager 110 and the parallel processing unit 120.

The parallel processing unit 120 may notify the load manager 110 of the existence of data parallel processes, which may be expressed by "registering". Here, registered contents may be separately managed. The load manager 110 may dynamically perform data parallel processing based on information regarding registered data parallel processes, and may manage at least one task.

Additionally, the load manager 110 may communicate with the OS controller 130, to measure the load of the system 100, or to dynamically manage tasks.

The dynamic task management system 100 may actually be operated along with other modules, in response to a command from the load manager 110.

Thus, the dynamic task management system 100 may perform operations for improvement in performance of parallel processing and therefore it is possible to improve performance of the system 100 by measuring and distributing loads of the system 100.

Figure 2:
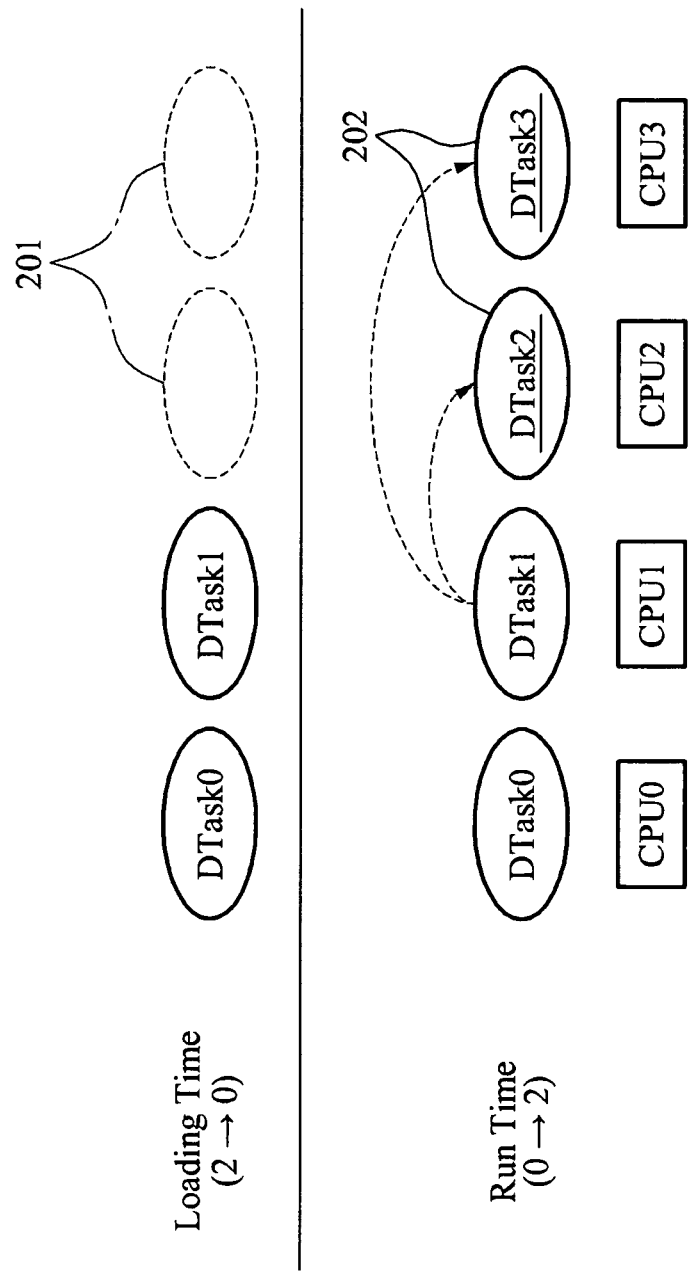
FIG. 2 illustrates an operation of a dynamic task management system according to embodiments when a core is available during a dynamic time.

FIG. 2 illustrates an operation of the dynamic task management system 100 when a core becomes available during a dynamic time, e.g., a dynamic interval.

Referring to FIG. 2, when a core 201 becomes available during the dynamic interval, the dynamic task management system 100 may duplicate currently processed tasks to create new tasks in the available core 201.

Specifically, when the parallel processing unit 120 generates a registration signal for a task, the load manager 110 may generate a dynamic management signal to request generation of the task in the available core 201.

In response to the generated dynamic management signal, the OS controller 130 may create tasks 202, namely, "DTask2" and "DTask3" in the available core 201. Here, the tasks 202 may be created by duplicating "DTask1" of currently processed tasks "DTask0" and "DTask1".

Tasks for data parallel processing that may be created or cancelled by the dynamic task management system 100 may partially process shared data. Accordingly, the tasks may execute the same function. In the embodiments, multiple data may be processed using a single function, in a manner similar to an operation of a Single Instruction, Multiple Data (SIMD) scheme.

Figure 3:
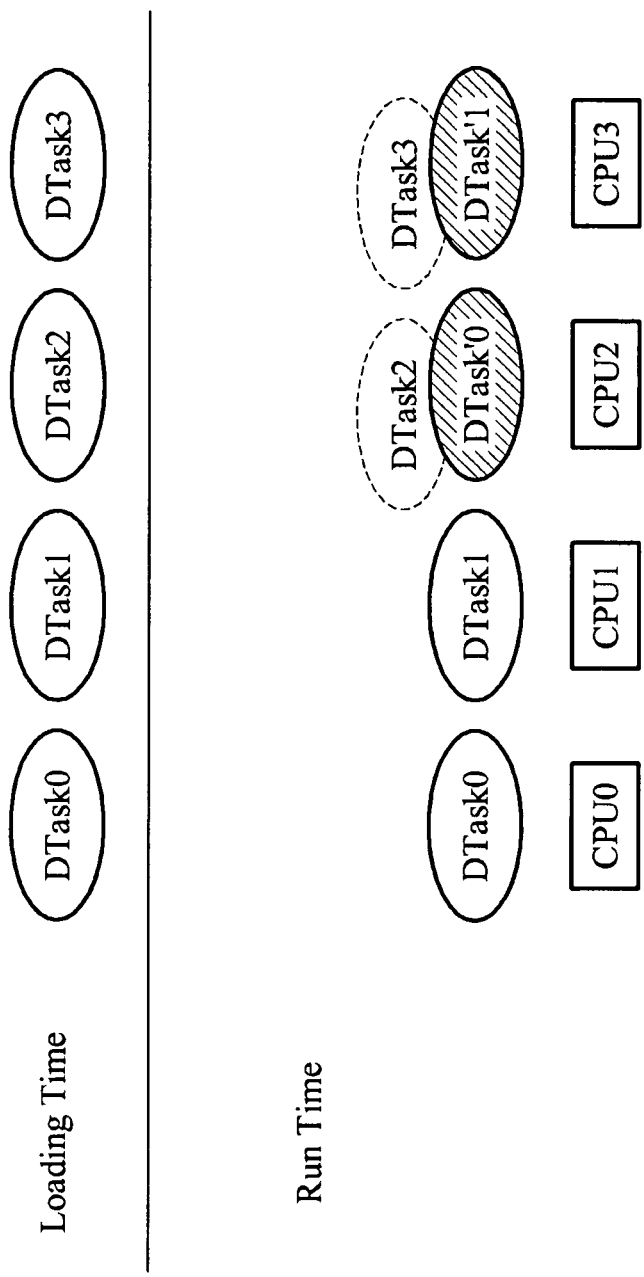
FIG. 3 illustrates an operation of a dynamic task management system according to embodiments when multiple parallel tasks exist in a single core.

FIG. 3 illustrates an operation of the dynamic task management system 100 when multiple parallel tasks exist in a single core.

Referring to FIG. 3, when multiple parallel tasks exist in a single core, the dynamic task management system 100 may cancel a part of currently processed tasks, may create new tasks, and may perform parallel processing using a core that was assigned to the cancelled tasks.

For example, when a first task set is assigned to a core in a loading time, and when a second task set is to be processed in a run time, a part of the core assigned to the first task set may be assigned to the second task set so that the second task set may be processed.

Figure 4:
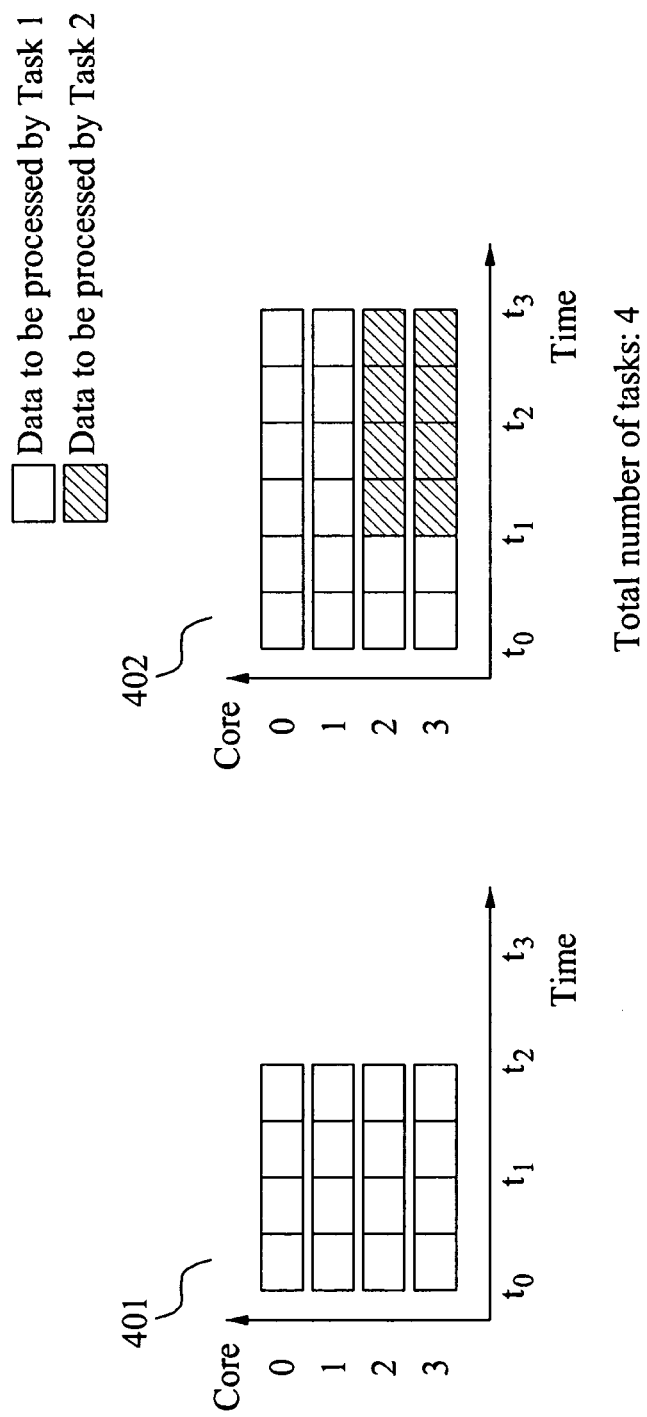
FIG. 4 illustrates an example where a dynamic task management system according to embodiments creates a new parallel task in an available core.

FIG. 4 illustrates an example where the dynamic task management system 100 creates a new parallel task in an available core.

Referring to FIG. 4, when a first task set is being parallel processed in cores 0 to 3 as shown in a graph 401, the dynamic task management system 100 may create and process a second task set in cores 2 and 3, as shown in a graph 402. Here, a part of the first task set currently performed in the cores 2 and 3 may be cancelled, and a number of new tasks that is identical to the number of cancelled tasks may be created in cores 0 and 1 so that the second task set may be formed.

Referring to the graph 402, a part of the first task set in cores 2 and 3 may be cancelled after time $t_1$, and the remaining tasks may be processed by the second task set in cores 0 and 1.

In other words, to process the parallel tasks, the dynamic task management system 100 may reduce a number of parallel tasks processed in cores 2 and 3, and may allow new parallel tasks to run in cores 2 and 3 as they become available.

Thus, it is possible to increase memory availability in view of overall performance, and to reduce overhead caused by context switching.

Specifically, when a core becomes available in the dynamic interval, the dynamic task management system 100 may increase a number of parallel processing tasks, and may increase utilization of the core. In other words, the dynamic task management system 100 may divide the core and use the divided core based on characteristics of CPU-intensive parallel processing tasks, rather than unnecessarily generating many tasks. Therefore, it is possible to optimize memory usage and reduce an overhead in the dynamic task management system 100.

Figure 5:
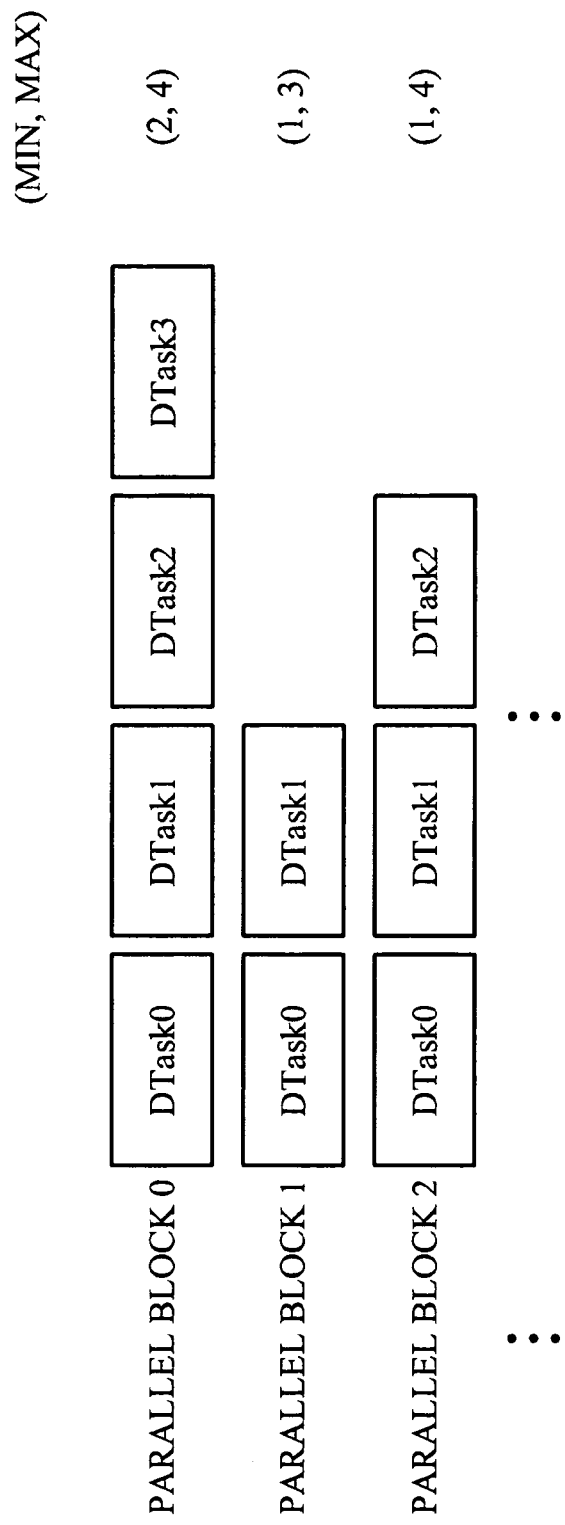
FIG. 5 illustrates an example where a dynamic task management system according to embodiments adjusts a number of cores assigned for each block and manages parallel blocks.

FIG. 5 illustrates an example in which the dynamic task management system 100 adjusts a number of cores assigned for each block and manages parallel blocks.

The dynamic task management system 100 may differentially adjust a number of cores assigned to parallel blocks, and may efficiently manage the parallel blocks. The parallel blocks used herein may have the same concept as a task set.

As shown in FIG. 5, each of the parallel blocks may contain at least one task. Here, a minimum value and a maximum value of a number of tasks contained in each of the parallel blocks may be set.

Referring to FIG. 5, a single data parallel processing block is referred to as a "parallel block", and may contain information on tasks in each of the parallel blocks. Additionally, each of the parallel blocks may maintain the minimum value and the maximum value.

Specifically, the minimum value and the maximum value may be maintained to ensure a Quality of Service (QoS). This means that only a predetermined number of tasks may be demanded for performance of the parallel blocks, not an excessive number of tasks. Since information on the minimum value and the maximum value reflects characteristics of the parallel blocks and the parallel tasks, the information may be provided when a user that is well aware of the fact requests parallel processing.

Accordingly, the load manager 110 may store a minimum value and a maximum value of a number of tasks created or cancelled in the at least one core, and may maintain the stored values.

The OS controller 130 may control the at least one task to be created or cancelled based on the stored minimum value and the stored maximum value.

In other words, the load manager 110 may set a range of a number of tasks created or cancelled in each core, based on the minimum value and the maximum value.

The minimum value may ensure a minimum performance of each core, and the maximum value may secure a saturation point of a performance of each core.

Referring to FIG. 5, a minimum value and a maximum value of parallel block 0 may be respectively set to 2 and 4, and a minimum value and a maximum value of parallel block 1 may be respectively set to 1 and 3. Additionally, a minimum value and a maximum value of parallel block 2 may be respectively set to 1 and 4.

In other words, at least two and up to four tasks may be processed in parallel block 0. Likewise, at least one and up to three tasks may be processed in parallel block 1, and at least one and up to four tasks may be processed in parallel block 2.

The minimum value and the maximum value of each core may be set based on a priority for a data parallel processing block of each core.

Additionally, the load manager 110 may determine a priority for a data parallel processing block of the at least one core. Here, the created task may be parallel processed based on the priority.

The dynamic task management system 100 may manage multiple parallel blocks, based on the priority of the parallel blocks, or based on a minimum value and a maximum value. Since a higher priority parallel block has a higher importance, the higher priority parallel block may be processed more rapidly. Additionally, a parallel block having a wide range between a minimum value and a maximum value may have as much flexibility as the range, and a parallel block with a high minimum value may be requested to be rapidly processed. Thus, it is possible to establish policies of multiple parallel blocks based on the above characteristics of parallel blocks.

The dynamic task management system 100 may dynamically manage only parallel tasks, or all tasks. Since parallel tasks are CPU intensive tasks, parallel tasks may be highly likely to use a single core. Accordingly, system performance may be significantly improved based on the parallel tasks only.

However, the parallel tasks may not use 100 percent of a CPU due to a standby time caused by synchronization or Direct Memory Access (DMA) operation.

Therefore, the dynamic task management system 100 may dynamically manage tasks more finely based on all of the tasks and loads in the system 100. Accordingly, the load manager 110 may check a load of the at feast one core. When the checked load is equal to or greater than a reference value, the load manager 110 may generate a dynamic management signal.

Figure 6:
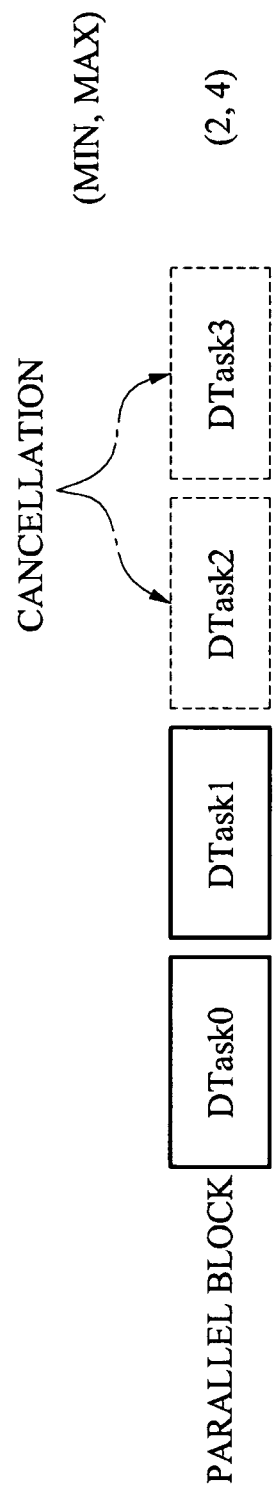
FIG. 6 illustrates an example where a dynamic task management system according to embodiments cancels a task.

FIG. 6 illustrates an example where the dynamic task management system 100 cancels a task.

The dynamic task management system 100 may terminate tasks "DTask2" and "DTask3" currently performed in a parallel block, and may cancel tasks "DTask2" and "DTask3." Specifically, the dynamic task management system 100 may stably terminate tasks "DTask2" and "DTask3" in a cancellation point. In other words, during the termination, at least two tasks may be cancelled since a minimum value is set to 2 in the parallel block.

When a termination request for a single parallel block is received, the dynamic task management system 100 may check information on tasks. In response to the termination request, the dynamic task management system 100 may select at least one of currently executed tasks, and may execute a termination command to cancel the at least one selected task.

Specifically, the load manager 110 may check at least one task in the data parallel processing block of the at least one core, and may generate a dynamic management signal used to request cancellation of the at least one checked task. In response to the generated dynamic management signal, the OS controller 130 may control the at least one checked task to be cancelled. For example, tasks "DTask2" and "DTask3" may be cancelled under the control of the OS controller 130.

The load manager 110 may store a minimum value of the number of tasks executable from at least one core.

The OS controller 130 may determine whether a number of tasks remaining in the at least one core is equal to or greater than the minimum value.

When the number of the remaining tasks is determined to be equal to or greater than the minimum value, the OS controller 130 may control the at least one checked task to be cancelled.

The dynamic task management system 100 may apply various policies to cancel a predetermined task.

For example, the dynamic task management system 100 may simply select the last task to cancel the selected task.

As another example, when multiple tasks exist in a single core, the dynamic task management system 100 may select a part of the multiple tasks.

The dynamic task management system 100 may terminate the selected task immediately after the task is selected. Alternatively, the dynamic task management system 100 may continue to execute the selected task until a predetermined point in time after the termination request, and may terminate the selected task at the predetermined point in time.

Figure 7:
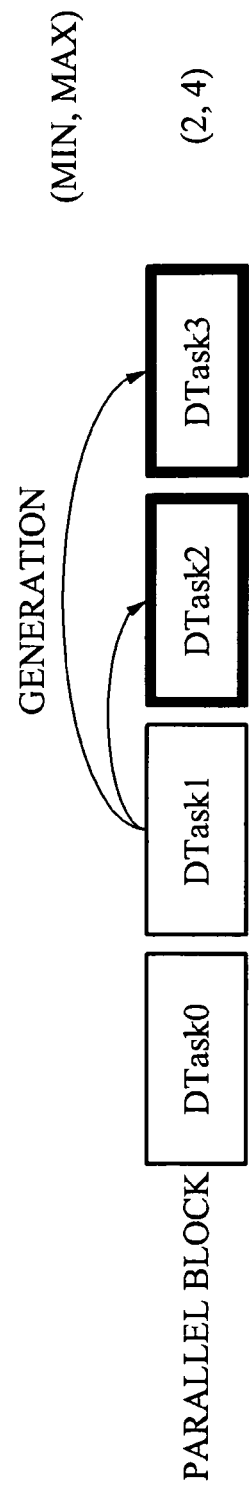
FIG. 7 illustrates an example where a dynamic task management system according to embodiments creates a task.

FIG. 7 illustrates an example where the dynamic task management system 100 creates a task.

When a single parallel block receives a generation request, the dynamic task management system 100 may check information on tasks.

Subsequently, the dynamic task management system 100 may select at least one task from among the tasks, and may generate a dynamic management signal to create a new task. Here, the dynamic task management system 100 may duplicate a task placed in the last position so that a new task may be created. Since all tasks in the parallel block are used to process the same operation, the above duplication and generation scheme may be applied.

Specifically, the load manager 110 may check a data parallel processing block of the at least one core.

The load manager 110 may generate a dynamic management signal. The dynamic management signal may be used to create at least one new task in the checked data parallel processing block.

In response to the generated dynamic management signal, the OS controller 130 may control the at least one checked task to be created.

Additionally, the load manager 110 may determine whether a number of tasks in a parallel block is within the range of a minimum value and a maximum value that are set in the parallel block during dynamic management of the tasks.

Specifically, when the number of tasks is equal to the minimum value, the load manager 110 may ignore the termination request. Likewise, when the number of tasks is equal to the maximum value, the load manager 110 may ignore the generation request.

The load manager 110 may actually create or terminate tasks, and may stop or restart operations of the tasks.

For example, the load manager 110 may inactivate or activate tasks to create or cancel tasks.

Thus, it is possible to reduce costs incurred by generation and cancellation of tasks.

For another example, a pool of tasks may be used to create or cancel tasks.

As a result, according to one or more embodiments, parallel tasks may be dynamically managed to fully utilize an available core and thus, it is possible to reduce a processing time while maintaining a stable QoS.

Additionally, according to the embodiments, it is possible to improve utilization of an available core, and to prevent unnecessary generation of tasks in advance by enabling a single parallel task to exist in each core.

Furthermore, according to one or more embodiments, an equal number of task memories and cores may be used and thus, it is possible to prevent a waste of system resources. In addition, it is possible to reduce an overhead due to context switching by reducing a number of unnecessary tasks.

Figure 8:
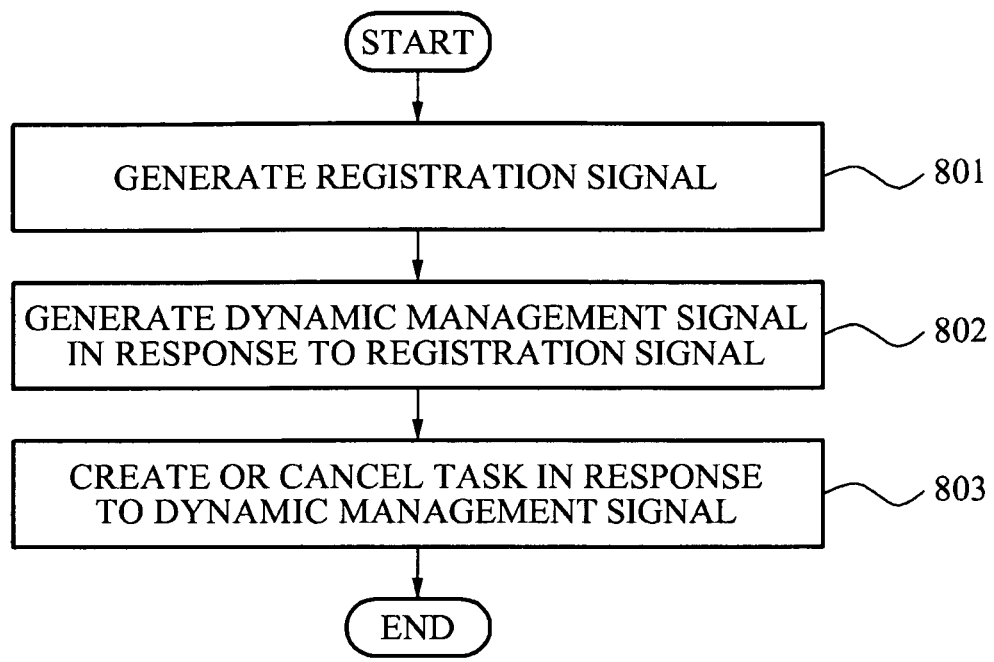
FIG. 8 illustrates a flowchart of a dynamic task management method according to embodiments.

FIG. 8 illustrates a flowchart of a dynamic task management method according to embodiments.

Referring to FIG. 8, in operation 801, a registration signal for a task to be parallel processed may be created.

In operation 802, a dynamic management signal may be generated in response to the generated registration signal. Here, the dynamic management signal may be used to dynamically manage at least one task.

In operation 803, the at least one task may be controlled to be created or cancelled in at least one core, in response to the generated dynamic management signal.

In accordance with the dynamic task management method of FIG. 8, when a core becomes available, utilization of the core may be improved by increasing a number of parallel processing tasks.

For example, tasks may be created as necessary and thus, a memory may be fully utilized. As another example, to process a single core and a single parallel task, a number of parallel tasks existing in the core may be reduced, and a new parallel task may be operated in the core that becomes available, so that system resources may be efficiently used.

Additionally, the dynamic task management method of FIG. 8 may include checking a load of the at least one core, and generating the dynamic management signal when the checked load is equal to or greater than a reference value. Thus, it is possible to determine dynamic management based on the load occurring in the system.

Figure 9:
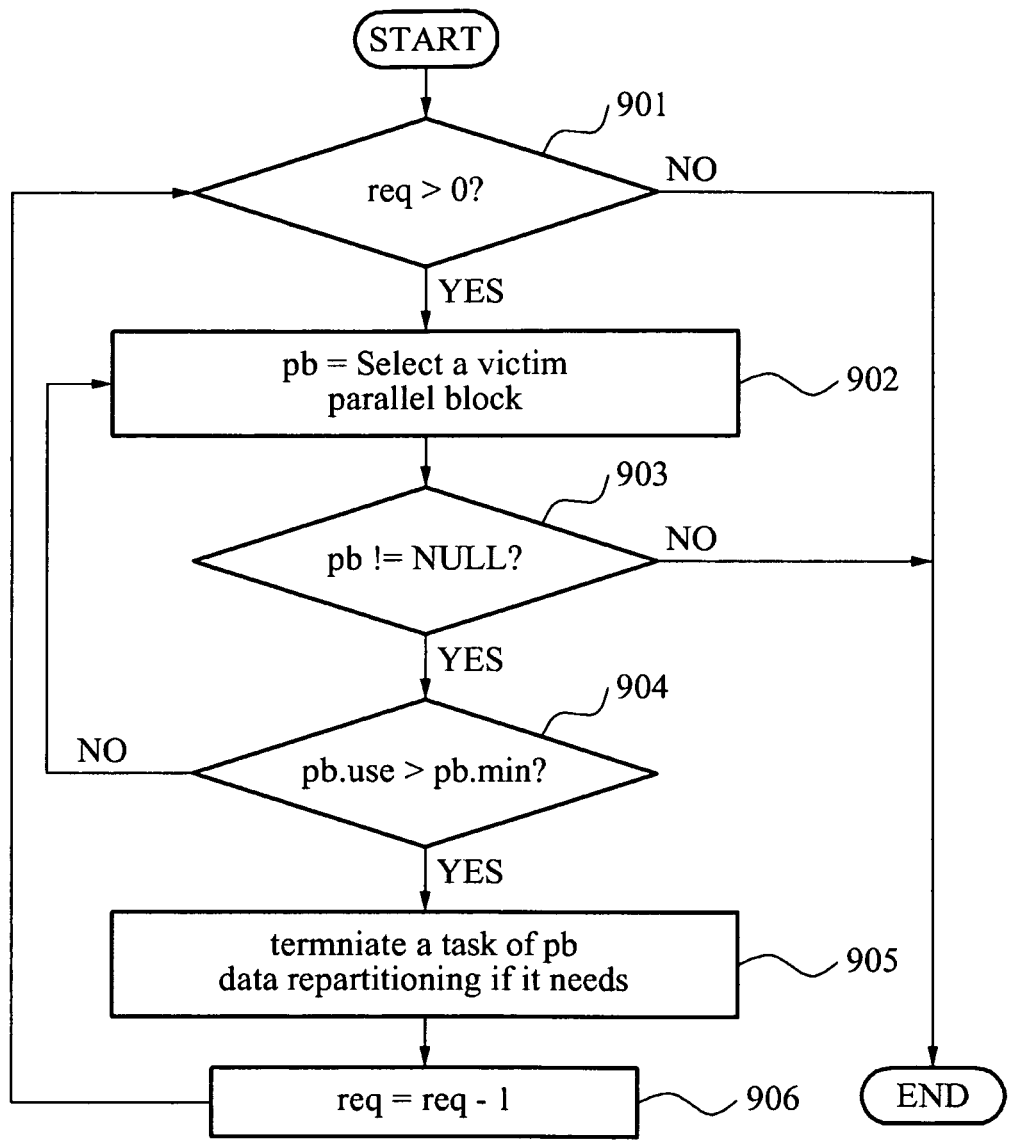
FIG. 9 illustrates a flowchart of a task cancellation operation in the dynamic task management method according to embodiments.

FIG. 9 illustrates a flowchart of a task cancellation operation in the dynamic task management method according to embodiments.

To cancel a task, at least one task in a data parallel processing block of at least one core may be checked.

For example, to cancel the at least one checked task, a dynamic management signal may be generated to request a cancellation of the at least one checked task.

In response to the generated dynamic management signal, the at least one checked task may be cancelled.

Specifically, in operation 901, whether "req" is greater than "0" may be determined, to determine whether a task to be terminated exists. Here, "req" may denote a number of tasks to be terminated.

When the number of tasks to be terminated "req" is determined to be greater than "0", a victim parallel block may be selected.

In operation 902, the victim parallel block may be set as "pb." In operation 903, whether "pb" has a null value may be determined.

When "pb" is determined to have a null value, the task cancellation operation may be completed by determining that there is no parallel block to be cancelled.

Conversely, when "pb" is determined to have a value other than the null value, "pb.use" may be compared with "pb.min" in operation 904. Here, "pb.use" may denote a number of tasks used by "pb", and "pb.min" may denote a minimum value of "pb." Operation 904 may ensure the overall QoS for the parallel block.

When "pb.use" is greater than "pb.min", a predetermined task of "pb" may be terminated in operation 905.

In operation 905, whether data repartitioning is performed may be determined, and as a result, data may be repartitioned as needed.

In operation 906, when a new value of "req" is obtained by subtracting 1 from the current value of "req", the dynamic task management method may return to operation 901.

Here, the victim parallel block may be determined based on the set priority, or based on loads in parallel blocks.

Additionally, while tasks may be individually terminated in a single parallel block according to the number of tasks to be terminated in the embodiments, all tasks able to be terminated in a single parallel block may be terminated. Furthermore, the data repartitioning may be performed every time a task is terminated, or may be performed once when all tasks are terminated.

Here, the number of tasks to be terminated in a parallel block may be equal to a number of tasks to be used in another parallel block. In other words, resources of the existing parallel block may be used for a new parallel block.

Figure 10:
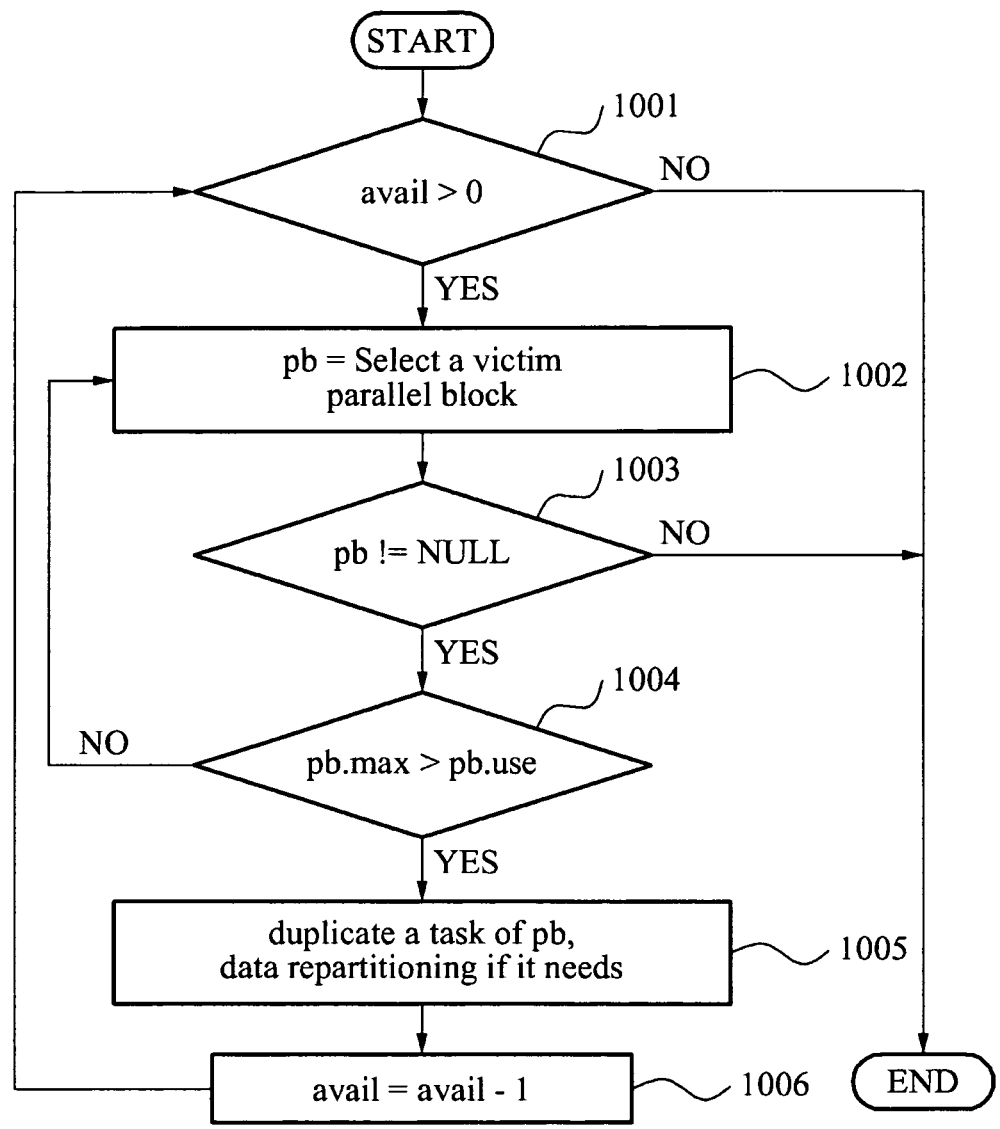
FIG. 10 illustrates a flowchart of a task generation operation in the dynamic task management method according to embodiments.

FIG. 10 illustrates a flowchart of a task generation operation in the dynamic task management method according to embodiments.

To create a task, a data parallel processing block of at least one core may be checked.

For example, to generate a task in the checked data parallel processing block, a dynamic management signal may be generated to request a generation of at least one new task in the checked data parallel processing block.

In response to the generated dynamic management signal, the at least one new task may be created.

Specifically, in operation 1001, whether "avail" is greater than "0" may be determined, to determine whether a task to be created exists. Here, "avail" may denote a number of tasks to be created.

When "avail" is determined to be greater than "0", a victim parallel block may be selected.

In operation 1002, the victim parallel block may be set as "pb". In operation 1003, whether "pb" has a null value may be determined.

When "pb" is determined to have the null value, the task generation operation may be completed by determining that there is no parallel block to be generated.

Conversely, when "pb" is determined to have a value other than the null value, "pb.use" may be compared with "pb.max" in operation 1004. Here, "pb.use" may denote a number of tasks used by "pb", and "pb.max" may denote a maximum value of "pb". Operation 1004 may prevent resources from being wasted due to unnecessary generation of tasks.

When "pb.use" is less than "pb.max", a predetermined task may be created in "pb" in operation 1005.

In operation 1005, whether data repartitioning is performed may be determined, and as a result, data may be repartitioned as needed.

In operation 1006, when a new value of "avail" is obtained by subtracting 1 from the current value of "avail", the dynamic task management method may return to operation 1001.

Here, the victim parallel block may also be determined based on the set priority, or based on loads in parallel blocks.

Additionally, while tasks may be individually created in a single parallel block according to the number of tasks to be created in the embodiments, all tasks able to be created in a single parallel block may be generated. Furthermore, the data repartitioning may be performed every time a task is created, or may be performed once when all tasks are created.

Therefore, in the dynamic task management method according to the embodiments, it is possible to ensure the minimum performance using the minimum value. Additionally, it is possible to prevent resources from being unnecessarily assigned based on the uppermost limit that is checked in advance, using the maximum value, to ensure a QoS of a parallel processing block.

The dynamic task management method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The instructions may be executed on any processor, general purpose computer, or special purpose computer such as a dynamic task management system or apparatus.

The described hardware devices may be configured to act as one or more software modules in order to perform the operations of the above-described example embodiments, or vice versa. The software modules may be controlled by any processor or computer. In addition, in some embodiments a computer-readable storage medium may be distributed among computer systems connected through a network and computer-readable codes or program instructions may be stored and executed in a decentralized manner.

As described above, according to the embodiments, parallel tasks may be managed to fully utilize an available core and thus, it is possible to reduce a processing time while maintaining a stable QoS.

Additionally, according to the embodiments, it is possible to improve a utilization of an available core.

Furthermore, according to the embodiments, it is possible to enable a single parallel task to exist in each core, to prevent in advance tasks from being unnecessarily created. In addition, as many task memories as a number of cores may be used and thus, it is possible to prevent a waste of system resources.

Moreover, according to the embodiments, it is possible to reduce an overhead due to context switching by reducing a number of unnecessary tasks.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A dynamic task management system, comprising:
   a processor to control one or more processor-executable units;
   a parallel processing unit to generate a registration signal for a task to be parallel processed;
   a load manager to generate a dynamic management signal in response to the generated registration signal, the dynamic management signal being used to dynamically manage at least one task; and
   an operating system (OS) controller, in response to the generated dynamic management signal, to control the at least one task to be cancelled in a current core where the at least one task is currently being executed and to create the at least one task in an idle core,
   wherein the load manager stores a minimum value and a maximum value of a number of tasks to be created or cancelled in at least one core, checks the at least one task in the data parallel processing block of the at least one core to be cancelled, and generates the dynamic management signal indicating cancellation, and
   wherein the OS controller determines whether the number of tasks remaining in the core is equal to or greater than the minimum value and controls the specific tasks to be cancelled in the core in response to the generated dynamic management signal.

2. The dynamic task management system of claim 1, wherein the load manager determines a priority for a data parallel processing block of at least one core, and
   wherein the created task is parallel processed based on the priority.

3. The dynamic task management system of claim 1, wherein the load manager checks the at least one task in the data parallel processing block of the at least one core to be created, and generates the dynamic management signal indicating creation, and
   wherein the OS controller determines whether the number of tasks remaining in the core is equal or less than the maximum value and controls the specific tasks to be created in the core in response to the generated dynamic management signal.

4. The dynamic task management system of claim 1, wherein the load manager checks a load of at least one core, and generates the dynamic management signal when the checked load is equal to or greater than a reference value.

5. A dynamic task management method, comprising:
   generating a registration signal for a task to be parallel processed;
   generating a dynamic management signal in response to the generated registration signal, the dynamic management signal being used to dynamically manage at least one task;
   controlling, in response to the generated dynamic management signal, the at least one task to be cancelled in a current core where the at least one task is currently being executed;
   storing a minimum value and a maximum value of a number of tasks to be created or cancelled in at least one core;
   checking the at least one task in the data parallel processing block of the at least one core to be cancelled, and generating the dynamic management signal indicating cancellation;
   determining whether the number of tasks remaining in the core is equal to or greater than the minimum value; and
   controlling the specific tasks to be cancelled in the core in response to the generated dynamic management signal.

6. The dynamic task management method of claim 5, further comprising:
- checking the at least one task in a data parallel processing block of at least one core to be created;
- generating the dynamic management signal indicating creation;
- determining whether the number of tasks remaining in the core is equal or less than the maximum value; and,
- controlling the specific tasks to be created in the core in response to the generated dynamic management signal.

7. A non-transitory computer-readable medium storing a program for instructing a computer to perform the method of claim 5.

* * * * *

UNITED STATES PATENT AND TRADEMARK OFFICE
CERTIFICATE OF CORRECTION

| | | |
|---|---|---|
| PATENT NO. | : 8,555,289 B2 | Page 1 of 1 |
| APPLICATION NO. | : 12/923793 | |
| DATED | : October 8, 2013 | |
| INVENTOR(S) | : Min Young Son et al. | |

It is certified that error appears in the above-identified patent and that said Letters Patent is hereby corrected as shown below:

In the Claims
In Column 10, Line 39, In Claim 3, after "equal" insert -- to --.
In Column 11, Line 8, In Claim 6, after "equal" insert -- to --.

Signed and Sealed this
Eighteenth Day of February, 2014

Michelle K. Lee
*Deputy Director of the United States Patent and Trademark Office*